United States Patent
Matsue et al.

(10) Patent No.: US 11,726,434 B2
(45) Date of Patent: Aug. 15, 2023

(54) SATELLITE RADIOWAVE RECEIVING DEVICE, ELECTRONIC TIMEPIECE, POSITIONING CONTROL METHOD, AND RECORDING DEVICE

(71) Applicant: CASIO COMPUTER CO., LTD., Tokyo (JP)

(72) Inventors: Takeshi Matsue, Kokubunji (JP); Tatsuya Sekitsuka, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1302 days.

(21) Appl. No.: 16/139,245

(22) Filed: Sep. 24, 2018

(65) Prior Publication Data
US 2019/0107814 A1    Apr. 11, 2019

(30) Foreign Application Priority Data
Sep. 25, 2017    (JP) .............................. JP2017-183256

(51) Int. Cl.
    *G01S 19/25*     (2010.01)
    *G04R 20/04*     (2013.01)

(52) U.S. Cl.
    CPC ............ *G04R 20/04* (2013.01); *G01S 19/256* (2013.01)

(58) Field of Classification Search
CPC ........ H04M 1/72412; G01S 19/23–235; G01S 19/256
See application file for complete search history.

(56) References Cited

U.S. PATENT DOCUMENTS

| | | | | |
|---|---|---|---|---|
| 2006/0036365 A1* | 2/2006 | Chiayee | ................... | G01S 19/37 342/357.42 |
| 2008/0191939 A1* | 8/2008 | Yu | ........................... | G01S 19/24 342/357.63 |
| 2008/0238765 A1* | 10/2008 | Zhang | ..................... | G01S 19/23 342/357.62 |
| 2009/0015470 A1* | 1/2009 | Fujisawa | ................ | G04R 20/06 342/357.62 |

(Continued)

FOREIGN PATENT DOCUMENTS

| CN | 101825866 A | 9/2010 |
|---|---|---|
| JP | H08-292245 A | 11/1996 |

(Continued)

OTHER PUBLICATIONS

Notice of Reasons for Refusal dated Sep. 7, 2021 received in Japanese Patent Application No. JP 2017-183256 together with an English language translation.

(Continued)

*Primary Examiner* — Erin F Heard
*Assistant Examiner* — Hailey R Le
(74) *Attorney, Agent, or Firm* — Scully, Scott, Murphy & Presser, P.C.

(57) ABSTRACT

A satellite radiowave receiving device includes a receiver receiving radiowaves transmitted from a positioning satellite; and a processor performing a positioning operation using the radiowaves received by the receiver. If the receiver starts receiving radiowaves for the positioning operation, the processor obtains date and time information based on radiowaves received from a single positioning satellite after the receiver starts receiving radiowaves. The processor preforms a positioning calculation using the obtained date and time information and preliminarily retained positional information on the positioning satellite.

17 Claims, 5 Drawing Sheets

(56) References Cited

U.S. PATENT DOCUMENTS

| | | | | |
|---|---|---|---|---|
| 2010/0220555 A1* | 9/2010 | Honda | ................... | G04R 20/04 368/14 |
| 2010/0295623 A1* | 11/2010 | Gronemeyer | ......... | G01S 19/256 331/44 |
| 2010/0328156 A1* | 12/2010 | Yu | ........................... | G01S 19/24 342/357.77 |
| 2012/0176868 A1* | 7/2012 | Matsuzaki | ............. | G04R 20/04 368/47 |
| 2015/0070211 A1* | 3/2015 | Cheng | .................... | G01S 19/27 342/357.51 |
| 2017/0134922 A1* | 5/2017 | Chiu | ........................ | G06F 1/163 |
| 2018/0203419 A1* | 7/2018 | Kinoshita | .............. | G04R 20/04 |
| 2020/0045161 A1* | 2/2020 | Cohen | ..................... | H04W 4/90 |

FOREIGN PATENT DOCUMENTS

| | | | |
|---|---|---|---|
| JP | 2008-054119 A | | 3/2008 |
| JP | 2008051529 A | * | 3/2008 |
| JP | 2011-169837 A | | 9/2011 |
| JP | 2014-109442 A | | 6/2014 |
| JP | 2014-169903 A | | 9/2014 |
| JP | 2015190851 A | | 11/2015 |
| JP | 2016008921 A | * | 1/2016 |
| JP | 2017106936 A | | 6/2017 |
| WO | 2017010230 A1 | | 1/2017 |

OTHER PUBLICATIONS

Notice of Reasons for Refusal dated Mar. 29, 2022 received in Japanese Patent Application No. JP 2017-183256 together with an English language translation.
First Office Action dated Nov. 2, 2022 received in Chinese Patent Application No. CN 201811116277.5.
Decision of Dismissal of Amendment dated Mar. 28, 2023 received in Japanese Patent Application No. JP 2017-183256.
Decision of Refusal dated Mar. 28, 2023 received in Japanese Patent Application No. JP 2017-183256.

* cited by examiner

SATELLITE RADIOWAVE RECEIVING DEVICE, ELECTRONIC TIMEPIECE, POSITIONING CONTROL METHOD, AND RECORDING DEVICE

CROSS REFERENCE TO RELATED APPLICATION

This application is based upon and claims the benefit of priority under 35 USC 119 of Japanese Patent Application No. 2017-183256 filed on Sep. 25, 2017, the entire disclosure of which, including the description, claims, drawings and abstract, is incorporated herein by reference in its entirety.

BACKGROUND

The technical field relates to a satellite radiowave receiving device, an electronic timepiece, a positioning control method, and a recording medium.

A satellite radiowave receiving device (positioning device) receives radiowaves from positioning satellites and calculates the positioning to identify the current position of the device. The radiowaves of each positioning satellite are transmitted with the positional information on the positioning satellite and the transmission date and time of radiowaves. The satellite radiowave receiving device obtains such information from a plurality of positioning satellites to calculate its current position based on the positions of these positioning satellites and differences in timing to receive radiowaves.

At the start of a positioning operation, it takes time to obtain the positional information on the positioning satellites and their transmission date and time information. To reduce the Time to First Fix (TTFF), i.e., the time to determine an initial position, there have been known a technique to preliminarily obtain and retain positional information on satellites, including predicted orbit information, from external servers by ground communications (Japanese Unexamined Patent Application Publication No. 2014-109442).

However, despite the retained positional information on the positioning satellites, an inaccurate date and time counted by the satellite radiowave receiving device results in obtaining an inaccurate position of each positioning satellite at the date and time, and eventually in an inadequate reduction in time to accurately determine the current position and especially the initial position of the satellite radiowave receiving device in positioning calculations.

SUMMARY

A satellite radiowave receiving device, an electronic timepiece, a control method for obtaining positioning information, and a recording medium are disclosed.

To achieve at least one of the abovementioned objects, according to one embodiment, a satellite radiowave receiving device includes:

a receiver receiving radiowaves transmitted from a positioning satellite; and a processor performing a positioning operation using the radiowaves received by the receiver;

wherein, if the receiver starts receiving radiowaves for the positioning operation, the processor obtains date and time information based on radiowaves received from a single positioning satellite after the receiver starts receiving radiowaves, and wherein the processor performs a positioning calculation using the obtained date and time information and preliminarily retained positional information on the positioning satellite.

DETAILED DESCRIPTION

An embodiment will now be described with reference to the drawings.

Figure 1:
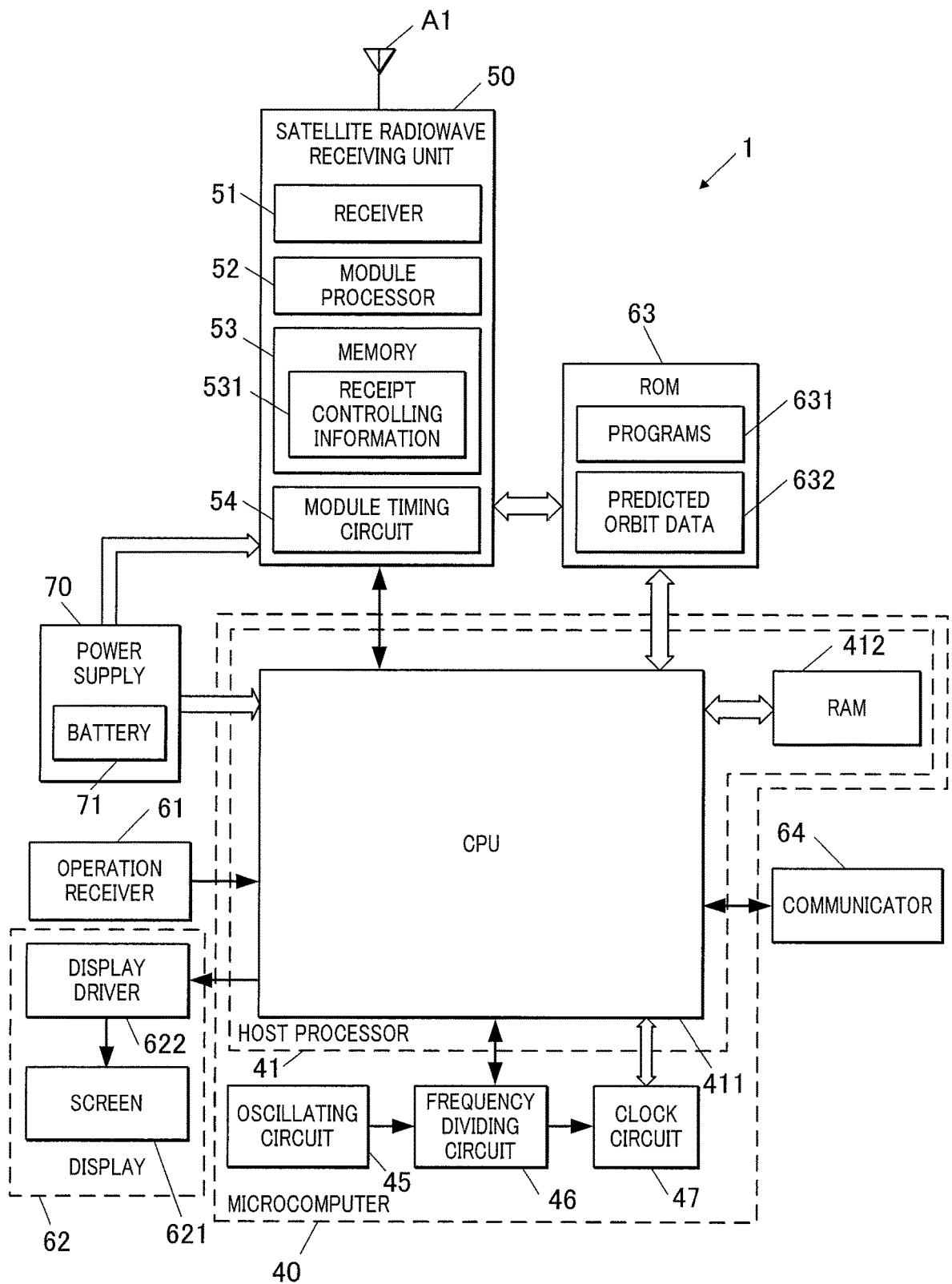
FIG. 1 is a block diagram illustrating a functional configuration of an electronic timepiece according to one embodiment of the present invention.

FIG. 1 is a block diagram illustrating a functional configuration of an electronic timepiece 1 according to an embodiment.

An electronic timepiece 1 may be any portable timepiece, for example, a wristwatch in this embodiment, though not limited. The electronic timepiece 1 includes a microcomputer 40, a satellite radiowave receiving unit 50, an antenna A1, an operation receiver 61, a display 62, a read only memory (ROM) 63, a communicator 64, and a power supply 70.

The microcomputer 40 performs various operations, such as control of the electronic timepiece 1, storage in memory, and counting of date and time. The microcomputer 40 includes a host processor 41, an oscillating circuit 45, a frequency dividing circuit 46, and a host clock circuit 47.

The host processor 41 administers the overall operations of the electronic timepiece 1. The host processor 41 includes a central processing unit (CPU) 411 and a random access memory (RAM) 412.

The CPU 411 performs various calculations to control a normal display of date and time and operations relevant to the various functions of the electronic timepiece 1, such as alarm notification, timer, and stop watch functions. The CPU 411 also controls display and notification of the results of a positioning operation or a date and time obtaining operation performed by the satellite radiowave receiving unit 50.

The RAM 412 provides the CPU 411 with a working memory and temporarily stores data. The temporary data includes information on time zone settings and local time settings (including daylight-saving time). The time zone settings are used to display the current date and time (local time) at a set position, such as the current position, in a region in the world. These local time settings may be updated in accordance with obtained current position information. The RAM 412 may be external to the microcomputer 40. The RAM 412 may also include a rewritable non-volatile memory in addition to DRAM.

The RAM 412 also stores the settings of an external device to be a communication partner of the communicator 64 (pairing settings).

The oscillating circuit 45 generates and outputs a signal with a predetermined frequency of, for example, 32.768 kHz (clock signal). A crystal oscillator, for example, is used to generate clock signals. The crystal oscillator may be external to the microcomputer 40. The frequency of the clock signals output from the oscillating circuit 45 may contain offset errors within an allowable range determined for the electronic timepiece 1. The frequency of the clock signals varies, depending on an external environment, primarily temperatures.

The frequency dividing circuit 46 frequency-divides the clock signals input from the oscillating circuit 45 into frequency-division signals with a predetermined frequency division ratio, and outputs the frequency-division signals. The frequency division ratio may be varied by the CPU 411.

The host clock circuit 47 counts signals with a predetermined frequency input from the frequency dividing circuit 46, which may be identical to that of the clock signals, to obtain and retain the current date and time (for example). The accuracy of the date and time obtained by the host clock circuit 47 depends on the accuracy of the clock signals from the oscillating circuit 45, i.e., the above-mentioned offset errors and the degree of variations in the frequency of the clock signals. The date and time obtained by the clock circuit 47 may include errors from an accurate date and time. The CPU 411 can modify the counted date and time based on the current date and time obtained by the satellite radiowave receiving unit 50.

The satellite radiowave receiving unit 50 can receive radiowaves transmitted from a positioning satellite in a global navigation satellite system (GLASS), such as Global Positioning System (GPS) of the U.S.A. The satellite radiowave receiving unit 50 processes the received radiowaves to obtain information on the current date and time and the current position. In response to a request of the processor 41 (CPU 411), the satellite radiowave receiving unit 50 outputs requested information in a predetermined format to the host processor 41. The satellite radiowave receiving unit 50 includes a receiver 51, a module processor 52 (a processor), a memory 53, and a module clock circuit 54.

The receiver 51 receives and acquires (or detects) radiowaves transmitted from a target positioning satellite and identifies the positioning satellite and the phase of signals in the transmitted radiowaves (a navigation message). The receiver tracks the radiowaves transmitted from the positioning satellite based on the acquired identification information of the positioning satellite and the phase and continuously demodulate and obtain the signals.

The module processor 52 includes a CPU and a RAM and controls the various operations of the satellite radiowave receiving unit 50. In response to an instruction of the host processor 41, the module processor 52 causes the receiver 51 to receive radiowaves from a positioning satellite at an appropriate timing and performs predetermined calculations for positioning, using the received radiowaves, to obtain the current date and time and the current position of the electronic timepiece 1 (satellite radiowave receiving device). The module processor 52 may be provided with a dedicated hardware circuit for various calculations. The results of the positioning may be output in a common format, such as NMEA-0183 (National Marine Electronics Association), or in a format specific to the electronic timepiece 1. The data output by the hardware circuit in a predetermined format may be processed as needed and output by the CPU. The RAM is provided in a control chip of the module processor 52. Alternatively, the RAM may be external to the control chip.

The memory 53 stores receipt controlling information 531, such as various setting data and received information, and control programs executed by the module processor 52 in the satellite radiowave receiving unit 50. Examples of the setting data include format data for navigation messages from each positioning satellite. The received information includes, for example, almanac and ephemeris, which are obtained orbit information on each positioning satellite. The memory 53 is a non-volatile memory and may be external to a control chip (a substrate) of the module processor 52.

The module clock circuit 54 counts date and time based on clock signals input from the oscillating unit (not shown in the drawings) in the satellite radiowave receiving unit 50. The module clock circuit 54 suspends counting date and time when the power supply to the satellite radiowave receiving unit 50 is cut off. The module counting circuit 54 restarts counting after the current date and time is obtained from a real time clock (RTC) (not shown in the drawings) when the satellite radiowave receiving unit 50 is activated. The date and time counted by the module clock circuit 54 may be date and time of the host clock circuit 47 obtained from the host processor 41 and modified. In the case where date and time is obtained based on the radiowaves from the positioning satellite received by the receiver 51, the date and time counted by the module clock circuit 54 may be modified based on the obtained date and time.

The operation receiver 61 receives external input operations, such as a user operation. The operation receiver 61 includes a push-button switch and a winding crown. In response to a pressing operation of the push-button switch or a pulling-out, rotating, or pushing-back operation of the winding crown, the operation receiver 61 outputs a corresponding operational signal to the host processor 41. Alternatively, the operation receiver 61 may include a touch sensor.

The display 62 shows various pieces of information in accordance with the control of the host processor 41. The display 62 includes a display driver 622 and a screen 621. The screen 621 displays digital information on a liquid crystal display (LCD) of a segment, dot-matrix or combination type. Alternatively, the display 62 may be configured to show information with needles and a stepping motor that rotates the needles, instead of the digital display on the display screen 621. In response to a control signal from the CPU 411, the display driver 622 outputs a drive signal on the display screen 621 to show information on the display screen 621. The information appearing on the display 62 includes the date and time information (in particular, the current date and time) obtained from the date and time counted by the host clock circuit 47, and date and time settings, set time, and measured time for the alarm notification, timer and stop watch functions. Information on the current position obtained through a positioning operation and local time settings can also be displayed.

The ROM 63 stores programs 631 and initial setting data. The programs 631 are for the host processor 41 and the module processor 52 to perform control operations. The programs 631 include control programs for obtaining the current date and time and positioning operations. The ROM 63 stores a non-volatile memory, such as a rewritable and updatable flash memory, in addition to or in place of a mask ROM. The ROM 63 stores predicted orbit data 632 externally obtained at the communicator 64 as rewritable and updatable data. The ROM 63 is read and write accessible by the host processor 41 and the module processor 52 and detachable from a mount portion, such as a slot.

The predicted orbit data 632 is accurate data that can be used in place of ephemeris, but need not be always identical to the ephemeris. The predicted orbit data 632 may be created by a third party irrelevant to a positioning system. The valid period of an ephemeris is 4 hours and updated every two hours. The predicted orbit data 632 may be data for a period longer than the valid period of an ephemeris, data for one week, for example. Thus the predicted orbit data 632 can be preliminarily obtained, on the previous day of a planned positioning operation (for going out), for example.

The communicator 64 performs two-way wireless communications with an external device to send and receive desired information. Any type of wireless communications may be used, and Bluetooth (registered trademark) is used in this embodiment. The host processor 41 communicates via the communicator 64 with an external device based on the pairing setting stored in the RAM 412. The communicator 64 externally obtains at least predicted orbit data 632 under the control of the host processor 41 and updates the ROM 63 with the obtained data.

The power supply 70 supplies power from a battery 71 to various units of the electronic timepiece 1, such as microcomputer and the satellite radiowave receiving unit 50, at a predetermined drive voltage. The supply or non-supply of power to the satellite radiowave receiving unit 50 can be controlled separately from power supply to the microcomputer 40 under the control of the host processor 41. The battery 71 is a replaceable dry-cell battery or a rechargeable battery and may include solar panels and an electricity charging (storing) unit.

The positioning operation of the electronic timepiece 1 according to this embodiment will now be described.

In the positioning calculation, as is known, three components of an unknown current position of the electronic timepiece 1 (satellite radiowave receiving device) in a space coordinate system, and a deviation of date and time counted by the electronic timepiece 1 from an accurate date and time are calculated using differences in the timing to receive radiowaves from four or more positioning satellites (pseudo range), the current positions of the four or more positioning satellites, and the date and time counted by the electronic timepiece 1. This calculation is performed by an iterative calculation (successive approximation), for example, the Newton-Raphson method (Newton's method). The iterative calculation involves a numerical convergence of a predetermined initial value to an unknown value.

The satellite radiowave receiving unit 50 performs a positioning operation in response to an instruction from the host processor 41 in the electronic timepiece 1 according to this embodiment. The current position of a positioning satellite can be obtained from an ephemeris contained in radiowaves transmitted and acquired from the positioning satellite. It takes 18 to 48 seconds at the longest to obtain an ephemeris in this case. Starting a positioning operation while a valid ephemeris within the valid period is preliminarily retained shortens the time to obtain initial results of positioning from the start of the positioning operation by the time to obtain an ephemeris (hot start). In the case where a valid ephemeris is not contained in receipt control information 531 and predicted orbit data 632 which is valid for a period covering the current date and time is retained, the electronic timepiece 1 according to this embodiment obtains and uses the predicted orbit data 632. This extends an interval from the last positioning operation and allows the electronic timepiece 1 to obtain the current position even when the valid period of ephemeris is expired.

The electronic timepiece 1 according to this embodiment obtains date and time information from any of the positioning satellites after starting to obtain radiowaves for the positioning operation. A difference between the current date and time counted as described above and the accurate date and time is unknown. Furthermore, the current position of a positioning satellite which is estimated based on the deviation also contains a deviation. An initial value used for the convergence calculation deviating from an accurate value or a greater error in the current position of a positioning satellite used as a known value is likely to extend the convergence time, what is worse, result in convergence into an inaccurate value. The electronic timepiece 1 preliminarily obtains and modifies the date and time information when obtaining the date and time data contained in the radiowaves received from the single positioning satellite which is acquired first and becomes a target of tracking after the start of receipt of radiowaves (e.g. TOW for GPS of the USA). This minimizes the deviation in the initial value or the position of the positioning satellite. In the case where the SNR of radiowaves transmitted from the positioning satellite acquired later is higher than those acquired first and an accurate current date and time can be obtained, the current date and time may be obtained from the radiowaves received from the single positioning satellite acquired later.

In the case of obtaining date and time information from a single positioning satellite, a propagation time of radiowaves from the positioning satellite to the electronic timepiece 1 is unknown and in the range of about 60 to 90 msec in general. Addition of, for example, an average value (about 75 msec) to the current date and time obtained from the received radiowaves can keep the counted date and time modified from the received radiowaves within an error range of about ±15 msec from an accurate date and time. Alternatively, known techniques may be used to modify date and time obtained from radiowaves received from a single positioning satellite.

The electronic timepiece 1 performs the positioning calculation using the counted date and time based on the date and time information obtained as described above and the positional information on the positioning satellite preliminarily retained (a valid ephemeris or predicted orbit data 632).

Figure 2:
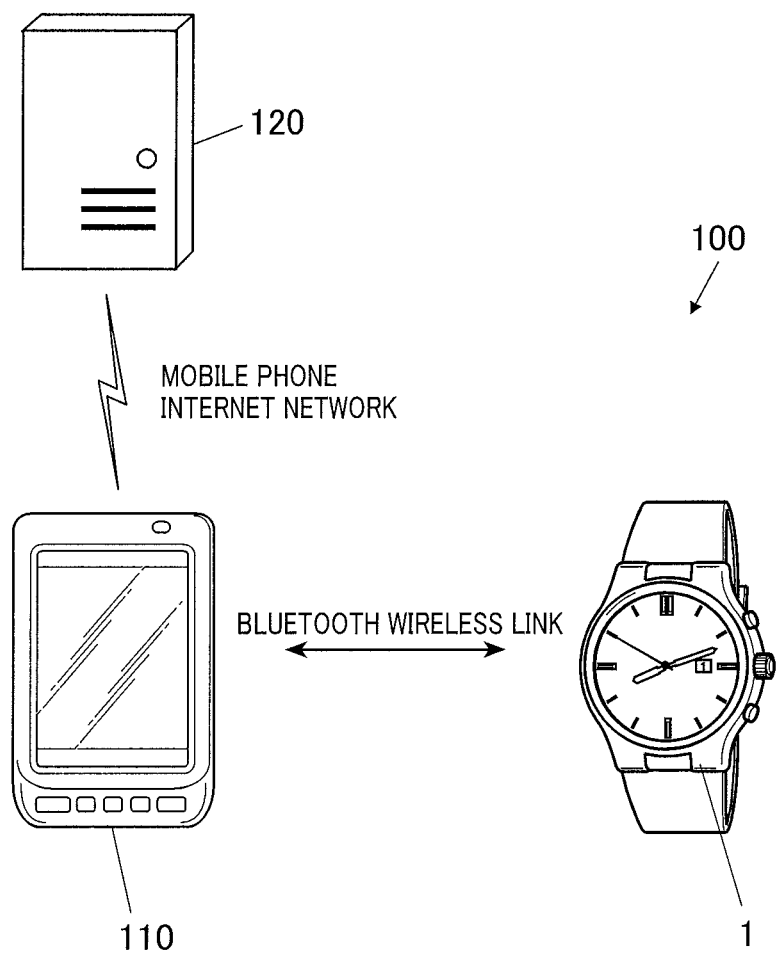
FIG. 2 illustrates a system configuration for obtaining predicted orbit data.

FIG. 2 illustrates a system configuration for obtaining predicted orbit data.

In a system 100, the electronic timepiece 1 can obtain predicted orbit data 632 through a predetermined input operation to the operation receiver 61. A server 120 stores the predicted orbit data 632 and is accessed by an external device 110, a communication partner of the communicator 64 of the electronic timepiece 1. Examples of the external device 110 include smartphones and tablet devices.

The external device 110 may allow a user to specify a period that requires data equivalent to an ephemeris, in which case predicted orbit data for the specified period is obtained from the server 120. Alternatively, the server 120 updates data regularly and the external device 110 may simply obtain the latest data. The electronic timepiece 1 obtains the predicted orbit data obtained and retained in the external device 110 via the communicator 64 under the control of the host processor 41. Alternatively, the electronic timepiece 1 may specify a required period for an ephemeris and send the designated period to the external device 110. The external device 110 may request the server 120 for predicted orbit data for the specified period.

Figure 3:
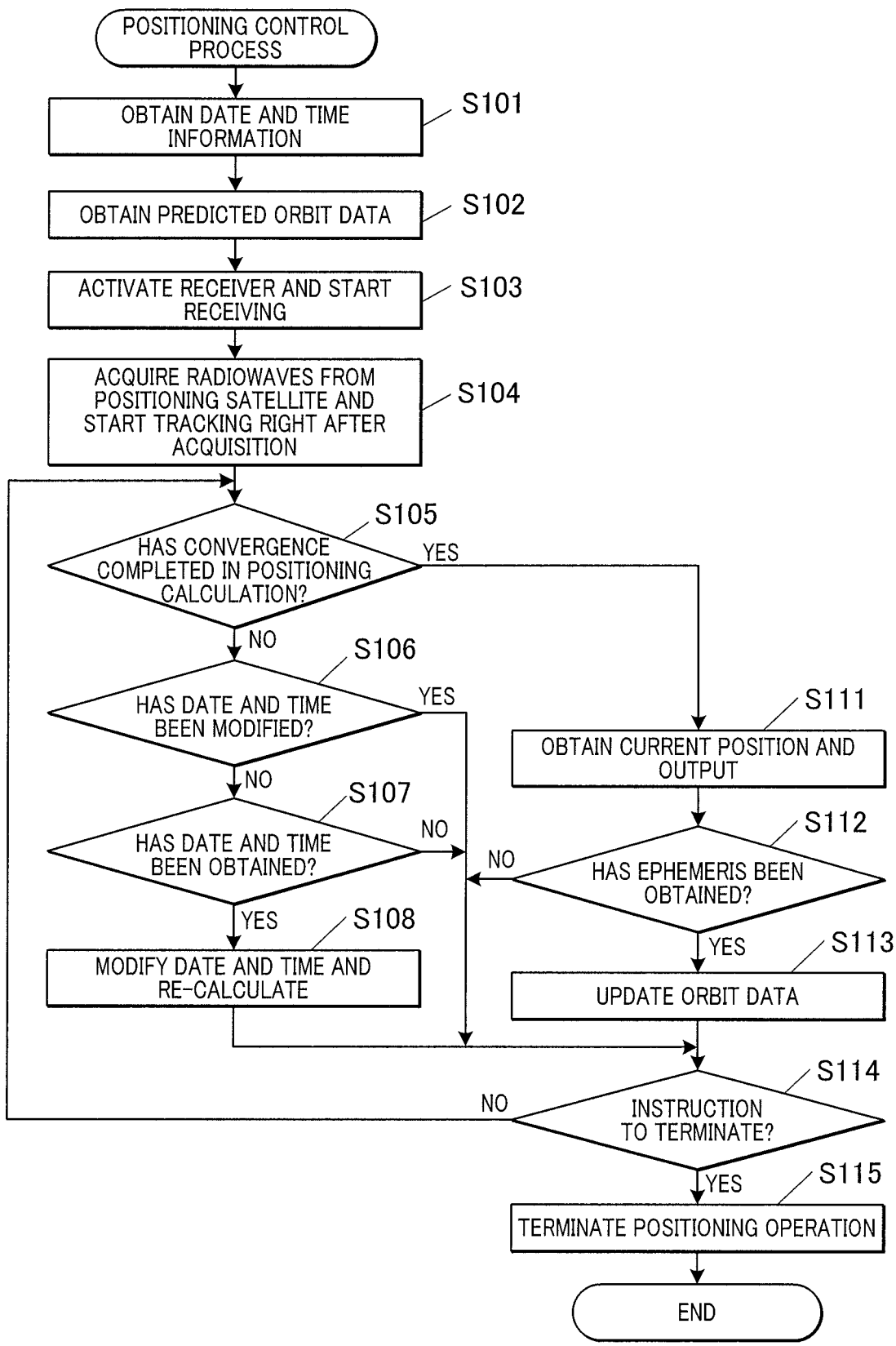
FIG. 3 is a flowchart illustrating a procedure for a positioning control process.

FIG. 3 is a flowchart illustrating a procedure for a positioning control process performed by the module processor 52 in the electronic timepiece 1.

The positioning control process starts in response to detection, by the module processor 52, of an instruction to start positioning being input to the satellite radiowave receiving unit 50 by the host processor 41. In the case where the satellite radiowave receiving unit 50 is not activated at the start of the process, the host processor 41 outputs an instruction to start positioning to the satellite radiowave receiving unit 50 concurrently with or after an instruction to activate the satellite radiowave receiving unit 50.

After the start of the positioning control process, the module processor 52 obtains the current date and time counted by the host clock circuit 47 from the host processor 41 (Step S101). The obtained current date and time may contain a deviation depending on the positioning satellite from which date and time is obtained at the last modification of date and time, the elapsed time since the modification, and the surrounding environment during the elapsed time. In the case where the date and time counted by the host clock circuit 47 has been modified by a user operation, a deviation may be derived from the modification. An error in the obtained current date and time needs to be in a range where the date (week number for GPS satellites) is correct through receipt of the radiowaves transmitted from positioning satellites.

The module processor 52 obtains the predicted orbit data 632 with reference to the ROM 63 (Step S102). The module processor 52 obtains the predicted orbit data 632 covering the current date and time or after the current date and time. In the case where a valid ephemeris is retained, the module processor 52 may not obtain the predicted orbit data 632 or may obtain the predicted data 632 after the valid period.

The module processor 52 activates the receiver 51 to start a receiving operation (Step S103). The module processor 52 starts acquiring radiowaves transmitted from a positioning satellite and starts tracking the radiowaves as acquired (Step S104). The module processor 52 starts a positioning calculation after radiowaves transmitted from the required number (four) of positioning satellites have acquired.

The module processor 52 determines whether values of the current position and date and time are obtained in the positioning calculation (whether convergence is completed to obtain values in convergence calculation) (STEP S105). If it is determined that values are obtained ("YES" at Step S105), the module processor 52 proceeds to Step S111.

If it is determined that values of the current position and date and time are not obtained (convergence is not completed or radiowaves transmitted from the required number of positioning satellites are not acquired) ("NO" at Step 105), the module processor 52 determines whether a modification of date and time has already been performed at Step S108 (Step S106). If it is determined that a modification is performed ("YES" at Step S106), the module processor 52 proceeds to Step S114.

If it is determined that a modification of date and time is not performed ("NO" at Step S106), the module processor 52 determines whether date and time information has been obtained from radiowaves transmitted from any one of the positioning satellites acquired (Step S107). It can be approved if the date and time has been obtained previously at Step S111. If it is determined that the date and time has not been obtained ("NO" at Step 107), the module processor 52 proceeds to Step S114. If it is determined that the date and time has been obtained ("YES" at Step S107), the module processor 52 modifies the current date and time counted by the module clock circuit 54 using the obtained date and time information (Step S108). If the positioning calculation has already started after the modification of the current date and time, the module processor 52 can re-perform a positioning calculation (re-calculation) based on the modified current date and time. The operations at Steps S107 and S108 constitute a step for obtaining the date and time information (method for obtaining the date and time information) in the positioning control method (program) according to this embodiment. The module processor 52 proceeds then to Step S114.

At Step S111 after the determination at Step S105, the module processor 52 obtains and outputs the current position and date and time obtained to the host processor 41 (Step S111). The operations at Steps S105 and S111 constitute a step for the positioning calculation (method for the positioning calculation) in the positioning control method (program) according to this embodiment. The module processor 52 modifies the current date and time counted by the module clock circuit 54 using the obtained date and time. This enables a correction of deviation of about ±15 msec due to the propagation time of radiowaves which could not be completely removed in the modification at Step S108.

The module processor 52 determines whether an ephemeris is obtained or not (Step S112). If it is determined that an ephemeris is not obtained ("NO" at Step S112), the module processor 52 proceeds to Step S114. If it is determined that an ephemeris is obtained ("YES" at Step S112), the module processor 52 updates a part of data for the period of the predicted orbit data retained by the obtained ephemeris (Step S113). In this way, the position of the positioning satellite at the current date and time is updated. The module processor 52 proceeds then to Step S114.

At Step S114 after Steps S106 to S108, S112, or S113, the module processor 52 determines whether an instruction to terminate the positioning operation is received from the host processor 41 (Step S114). If it is determined that an instruction is not received ("NO" at Step S114), the module processor 52 returns to Step S105. If it is determined that an instruction is received ("YES" at Step S114), the module processor 52 stops the operation of the receiver 51 and performs various operations to terminate the calculation (Step S115). The positioning control process is then terminated.

Modification Example

Figure 4:
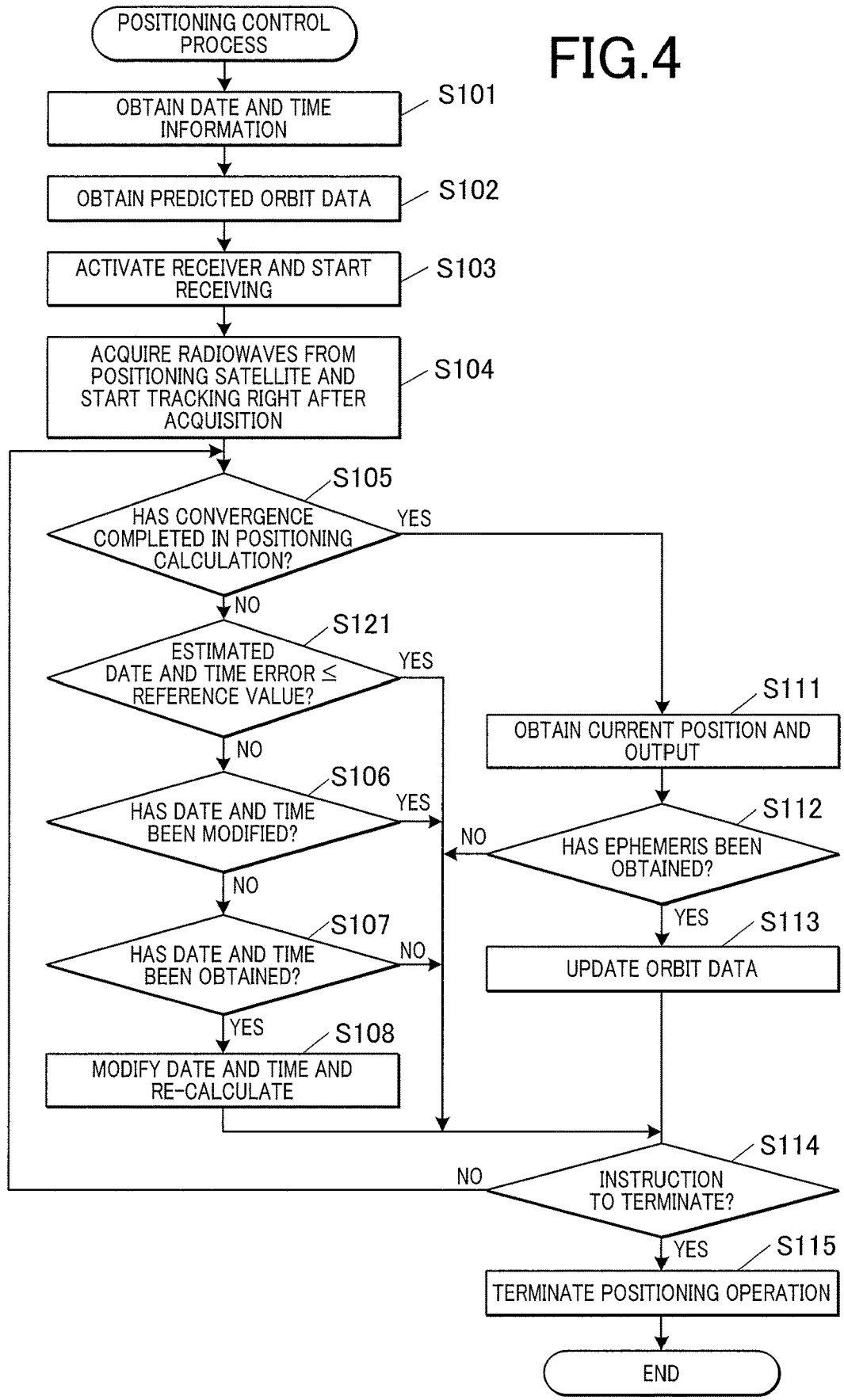
FIG. 4 is a flowchart illustrating a modification example 1 of the positioning control process.

FIG. 4 is a flowchart illustrating a modification example 1 of the procedure for a positioning control process.

The positioning control process in the modification example is identical to the positioning control process in the above-described embodiment, except for the addition of Step S121. The same steps are given the same reference numerals without redundant explanation.

If it is determined that a positioning result is not obtained at Step S105 ("NO" at Step S105), the module processor 52 determines whether an error (maximum error) in date and time assumed of the date and time counted by the module clock circuit 54 (date and time counted by the host clock circuit 47) is equal to or smaller than the reference value (Step S121). If it is determined that an error is equal to or smaller than the reference value ("YES" at Step 121), the module processor 52 proceeds to Step S114. If it is determined that an error is not equal to or smaller than the reference value ("NO" at Step S121), the module processor 52 proceeds to Step S106.

The assumed error in date and time is calculated by multiplying an amount of deviation per unit of time assumed of the host clock circuit 47 by an amount of elapsed time since the last update of date and time in the host clock circuit 47 (rate of, for example, 0.5 sec per day), for example. The calculation may be performed by the host processor 41 and output to the module processor 52, or performed by the module processor 52. When the last update of date and time is obtained via an external device from a time server, an amount variable according to the time server or a fixed amount, about 0.5 sec, for example, may be added to the assumed error. In the case where the electronic timepiece 1 includes a temperature sensor, the accumulated error in date and time may be assumed by adding an amount of deviation in the date and time counted by the host clock circuit 47 at appropriate intervals based on the history of temperature measured by the temperature sensor.

In the electronic timepiece 1, when a deviation in the current date and time counted by the module clock circuit 54 is assumed to be small enough not to affect the convergence calculation or when the accuracy is assumed to decrease rather reliably or unnecessarily by obtaining a current date and time from a single positioning satellite, the determining (selecting) control based on the maximum error assumed in the current date and time may be added to avoid overly modifying the current date and time.

Modification Example 2

Figure 5:
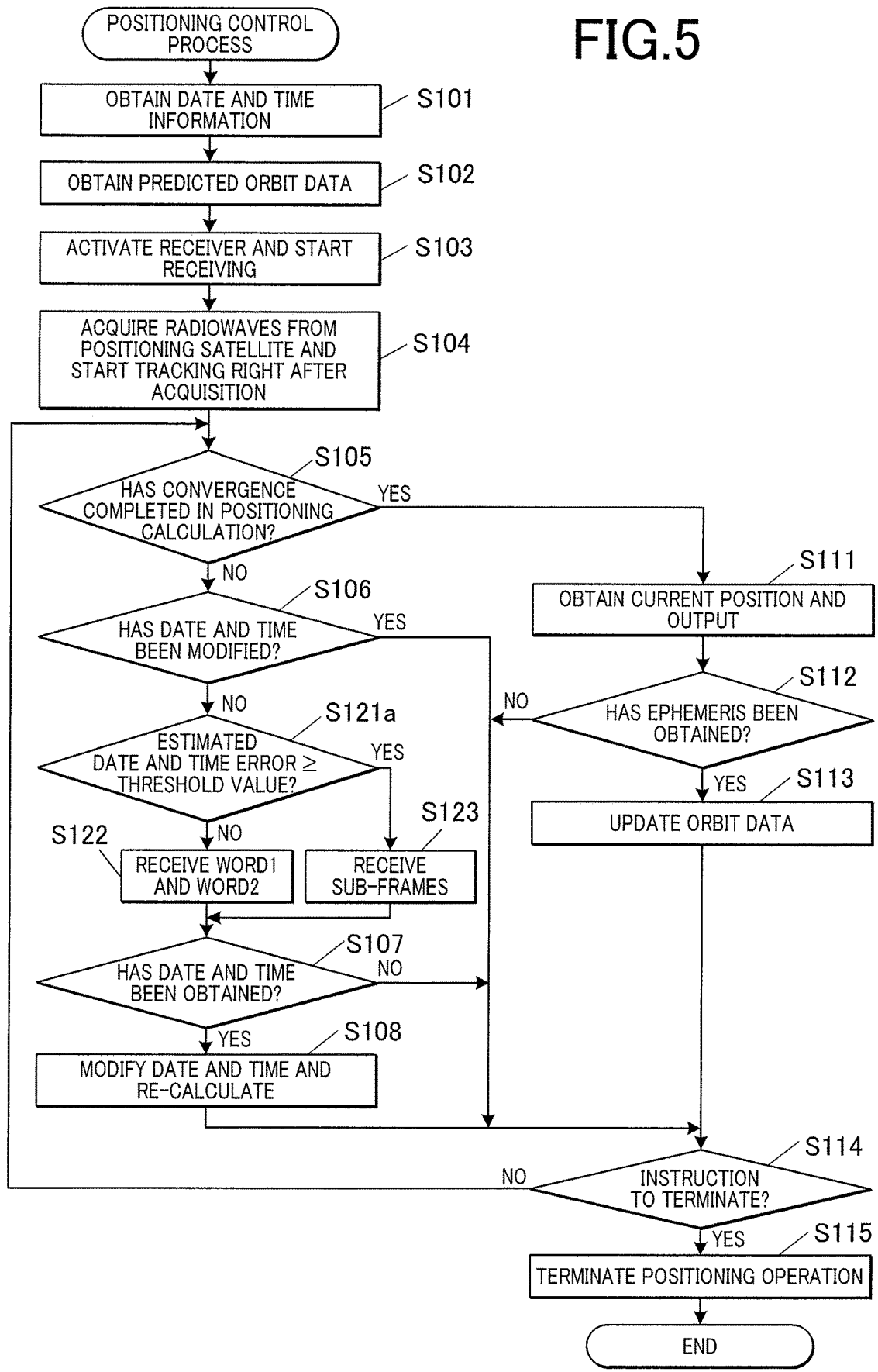
FIG. 5 is a flowchart illustrating a modification example 2 of the positioning control process.

FIG. 5 is a flowchart illustrating a modification example 2 of the positioning control process.

The positioning control process in the modification example is identical to the positioning control process in the above-described embodiment, except for the addition of Steps S121a, S122, and S123. The same steps are given the same reference numerals without redundant explanation.

If it is determined at Step S106 that a modification of date and time is not performed at Step S108 ("NO" at Step S106), the module processor 52 determines whether an error (maximum error) in date and time assumed of the current date and time counted by the module clock circuit 54 is equal to or larger than a predetermined threshold value (Step S121a). If it is determined that the maximum error is larger than the threshold value ("YES" at Step S121a), the module processor 52 identifies data of an arbitrary sub-frame (6 sec) and receives all of the data to determine the date and time by obtaining the TOW in the sub-frame (Step S123). The module processor 52 then proceeds to Step S107.

If it is determined that the maximum error is smaller than the threshold value ("NO" at Step S121a), the module processor 52 identifies a preamble which is a specific string of signs in WORD1 in an arbitrary sub-frame based on the current date and time counted, and receives WORD2 with TOW. The module processor 52 performs a setting operation to identify the current date and time when the TOW is obtained at receipt of the TOW (Step S122). The module processor 52 then proceeds to Step S107. Identification of the current date and time by receipt of only WORD1 and WORD2 (received radiowave length of 60 bits, about 1.2 sec) reduces the time required for identifying the date and time, compared to identification by receipt of sub-frame (received radiowave length of 300 bits, about 6 sec), but may increase possibility of misidentifying the current date and time, compared to identification by receipt of overall sub-frame.

As described above, the satellite radiowave receiving unit 50, which is an embodiment of the satellite radiowave receiving device according to this invention, includes the receiver 51 and the module processor 52. The receiver 51 receives radiowaves from positioning satellites and the module processor 52 performs the positioning operation using the radiowaves received by the receiver 51. When the receiver 51 starts receiving radiowaves for positioning, the module processor 52 obtains date and time information based on the radiowaves transmitted from a single positioning satellite and performs the positioning calculation using the date and time information obtained and the positional information on the positioning satellite preliminarily retained.

When the positioning starts with positional information on the positioning satellite such as an ephemeris or replacement data being preliminarily retained, the counted date and time is modified with the obtained date and time right after the date and time information is obtained at the start of receipt. The calculation of the current position starts using the modified date and time and retained positional information on the positioning satellite. This enables more accurate determination of the initial parameters at the start of positioning calculation and the current position of the positioning satellite. This prevents convergence to an inaccurate position or date and time in the positioning calculation and an accurate current position can be reliably obtained by convergence within a shorter time. The satellite radiowave receiving unit 50 can reduce the Time To First Fix (TTFF), i.e., the time to determine an accurate initial position more accurately.

The satellite radiowave receiving unit 50 can obtain positional information on a positioning satellite externally, other than from radiowaves transmitted from a positioning satellite. The module processor 52 can read out and use the predicted orbit data 632 which the host processor 41 stores in the ROM 63 via the communicator 64 in the electronic timepiece 1. In this way, the first positioning result can be obtained reliably within a short time without a valid ephemeris retained due to a long interval from the last positioning. A positioning result can be obtained within a short time in a single positioning operation where an ephemeris is not obtained. In that case, the positioning calculation starting after the above-mentioned date and time modification can improve the reliability of obtaining accurate date and time information more effectively within a short time. Similarly, when a different positioning satellite is acquired during consecutive positioning operations, a combination of radiowaves from the positioning satellites used for the positioning calculation is changed so that an accurate position can be reliably determined.

The electronic timepiece 1 includes the communicator 64 which communicates with an external device. The module processor 52 obtains the predicted orbit data 632 of the positioning satellite via the communicator 64.

With such communication, via BlueTooth for example, as well as receipt of radiowaves, desirable data can be obtained within a short time at a timing when the user can process the data. This allows the user to obtain anytime the current position (initial position) in an environment where positioning operations can be performed, without much trouble for the user. This can improve the convenience of positioning operation for user. The date and time obtained by the communicator 64 from an external device is not always sufficiently accurate. To improve the accuracy and reduce the required time in determination of the initial position, an accurate date and time is to be more reliably obtained based on the radiowaves transmitted from the positioning satellite at the start of the positioning operation, even if date and time can be obtained as described hereinbefore.

The satellite radiowave receiving unit 50 includes the module timing circuit 54 counting date and time. The module processor 52 determines whether date and time information is to be obtained before the positioning operation according to the assumed maximum error for the date and time counted by the module timing circuit 54, i.e. the counted date and time obtained by the host timing circuit 47 before the start of positioning operation. In other words, it is not necessary to obtain date and time information when the accuracy of date and time is sufficiently ensured without obtaining date and time information. In that case, there is hardly any change in the time required to obtain the positioning result or any difference in the accuracy, regardless of the date and time obtaining operations. In the satellite radiowave receiving unit 50, the burden on positioning operation can be slightly reduced by omitting the operations for obtaining and updating of date and time.

The module processor 52 determines the receipt length of radiowave for date and time information obtained before the positioning operation in accordance with the maximum error assumed for the date and time counted by the module timing circuit 54. In other words, the satellite radiowave receiving unit 50 preliminarily determines whether the current date and time is determined only with the receipt of WORD1 and WORD2 according to the assumed error in the current date and time or after the receipt of sub-frame.

The above-mentioned calculation method enables convergence into an accurate date and time with the receipt of WORD1 and WORD2 almost reliably when a deviation in date and time is sufficiently small, but may also result in convergence into an inaccurate date and time when the deviation in date and time is large. For improvement of the accuracy of obtaining date and time, the misidentification due to a hasty operation can be prevented while the advantages from preliminary retention of the positional information on the positioning satellite are maintained.

The electronic timepiece 1 in this embodiment includes the above-mentioned satellite radiowave receiving unit 50. The electronic timepiece 1 may also include the communicator 64 which provides the satellite radiowave receiving unit 50 with the predicted orbit data 632. This allows the electronic timepiece 1 to identify the current position in a short time reliably and more accurately even after a long positioning interval. This reduces the time for the user to wait until the current position is obtained, and traveling or other actions of the user are not disturbed.

The positioning control method in the electronic timepiece 1 according to this embodiment is a positioning control method using the receiver 51 which receives the radiowaves from the positioning satellite. The method includes a step for obtaining date and time information to obtain date and time information based on the radiowaves received from a single positioning satellite after the receiver 51 starts receiving the radiowaves for the positioning operation and a step for positioning calculation to perform a positioning calculation using the obtained date and time information and the ephemeris or predicted orbit data 632, i.e. the positional information of the positioning satellite preliminarily retained.

When the positioning operation starts with positional information on the positioning satellite such as an ephemeris or replacement data being preliminarily retained, the counted date and time is modified with the obtained date and time right after obtaining the date and time at the start of receipt, and the calculation of the current position starts using the modified date and time and retained positional information on the positioning satellite. Such a positioning control prevents convergence into an inaccurate position or date and time in the positioning calculation, and enables convergence into an accurate current position reliably within a shorter time to obtain the result. This positioning control method can reduce the Time To First Fix (TTFF), i.e., the time to determine an accurate initial position more reliably.

The receiver 51 installs and executes the programs 631 which perform the above-described control method for obtaining positioning information in an electronic device including the receiver 51 and capable of performing a positioning operation. This allows the electronic device to easily obtain an accurate current position more reliably within a short time. This also allows various electronic devices to obtain the initial data of the current position reliably, without keeping the user waiting for a long time.

The present invention should not be limited to the above embodiment and various modifications are available.

For example, in the above-described embodiment, the date and time identified in the positioning calculation can be used unchanged in the case where the positioning calculation is eventually completed with the quick receipt of radiowaves from a plurality of positioning satellites before obtaining date and time from a single positioning satellite because of the sufficient accuracy of date and time and the favorable environment for receiving radiowaves from positioning satellites. The satellite radiowave receiving unit 50 can start the positioning calculation itself before the date and time information is acquired (the current date and time is determined according to the identification process). However, the positioning calculation may start only after date and time is obtained.

In the above embodiment, the predicted orbit data is obtained externally in two steps via a smart phone, an electronic device capable of performing the near field communication, using Bluetooth. Alternatively, the satellite radiowave receiving unit 50 may directly access the server over a wireless LAN to acquire the predicted orbit data.

In the above-described modification example 2, a sub-frame is received based on an assumed error in date and time, though not limitative. When the date and time which is accurate enough not to require receiving a sub-frame can be obtained based on the predicted orbit data 632, the receipt of date and time in the above-described embodiment can be limitative such that the date and time is received only through the receipt of WORD1 or WORD2, within a short time. Alternatively, in the case where a sign sequence which is not a preamble is likely to be misidentified as a preamble because of a problem of a sign sequence, not an assumed error in date and time, such as overlapping of a preamble and other sections such as ROW or WN, the date and time may be obtained through the receipt of a sub-frame. In that case, the receipt time may not be prolonged to receive a sub-frame, but the number of words to be received may be increased to three.

In the above-described embodiment, the module processor 52 and the module clock circuit 54 which are locally equipped in the satellite radiowave receiving unit 50 and the host processor 41 and the host clock circuit 47 in the electronic timepiece 1 are separately provided. However, a single processor or clock circuit may be provided to be commonly used in each operation.

In the above-described embodiment, the positioning operation is sequentially repeated after the start of positioning operation. However, the positioning operation may end each time a current position is obtained. In that case, to reliably reduce the time to obtain an accurate positioning result and end the positioning operation, predicted orbit data is to be preliminarily obtained and retained and a current date and time is to be obtained for a positioning calculation using the current date and time obtained at the positioning operation.

In the above-described embodiment, the operation to maintain date and time accuracy is based on the accuracy of the date and time counted by the host clock circuit 47. However, the operation may be based on the accuracy of the date and time obtained from the RTC included in the satellite radiowave receiving unit 50. Alternatively, in the case where the satellite radiowave receiving unit 50 is always activated, the process may be performed based on the accuracy in counting of the host clock circuit 47.

In the above-described embodiment, the host processor 41 controls the operation of the communicator 64 and the module processor 52 obtains the predicted orbit data 632 obtained by the host processor 41 via the communicator 64, accessing through the internal signal path. However, the module processor 52 may directly control the communicator 64 and obtain the predicted orbit data 632 externally. The predicted orbit data may be stored and retained in the memory 53 in the satellite radiowave receiving unit 50, not in the ROM 63.

In the above-described embodiment, the satellite radiowave receiving unit 50 in the electronic timepiece 1 is exemplified, though not limitative in any way. Radiowaves may be received from any positioning satellites. Radiowaves from positioning satellites in several global positioning systems or those from regional positioning satellites, which supplement the functions of the global positioning systems, may be present at the same time.

In the above description, the programs 631 for controlling the acquisition of positioning information according to the present invention are stored in a computer-readable recording medium, such as a nonvolatile memory, including a flash memory, and the ROM 63, including a mask ROM, though not limitative in any way. Any other type of computer-readable recording medium may be used, for example, a portable recording medium, such as hard disk drive (HDD), CD-ROM, and DVD disk. The present invention is also applicable to carrier waves, a medium which provides the programs according to the present invention with data via a communication line.

It should be understood that the details of the configurations, control procedures, and display examples shown in the above embodiment can be appropriately modified without departing from the scope of the present invention.

The embodiments described above should not be construed to limit the present invention, and the claims and other equivalents thereof are included in the scope of the invention.

What is claimed is:

1. A satellite radiowave receiving device comprising:
    a processor, wherein the processor obtains first date and time information included in radiowaves received via a receiver from a single positioning satellite which is acquired first after a start of receipt of radiowaves,
    wherein, in response to the processor receiving radiowaves via the receiver from multiple satellites which include the single positioning satellite and which are required for a positioning calculation, the processor modifies second date and time information which is counted by a clock circuit using the first date and time information,
    wherein the processor performs the positioning calculation using the second date and time information of the multiple positioning satellites and a predicted orbit data retrieved from a memory of the device, and
    wherein the predicted orbit data is collected and retained in the memory before the obtaining of the radiowaves for retrieval.

2. The satellite radiowave receiving device according to claim 1,
    wherein the processor obtains the predicted orbit data externally, other than from radiowaves transmitted from the multiple positioning satellites, and stores the obtained data in the memory.

3. The satellite radiowave receiving device according to claim 2,
    wherein the processor determines whether date and time information is to be obtained before the positioning calculation according to a maximum error assumed in the second date and time counted by the clock circuit.

4. The satellite radiowave receiving device according to claim 3,
    wherein the processor determines a receipt length of radiowaves for the second date and time information to be obtained before the positioning calculation according to the maximum error assumed in the second date and time counted by the clock circuit.

5. The satellite radiowave receiving device according to claim 2,
    wherein the processor determines a receipt length of radiowaves for the second date and time information to be obtained before the positioning calculation according to a maximum error assumed in the second date and time counted by the clock circuit.

6. The satellite radiowave receiving device according to claim 1, comprising a communicator communicating with an external device,
    wherein the processor obtains the predicted orbit data via the communicator.

7. The satellite radiowave receiving device according to claim 6,
    wherein the processor determines whether date and time information is to be obtained before the positioning calculation according to a maximum error assumed in the second date and time counted by the clock circuit.

8. The satellite radiowave receiving device according to claim 7,
    wherein the processor determines a receipt length of radiowaves for the second date and time information to be obtained before the positioning calculation according to the maximum error assumed in the second date and time counted by the clock circuit.

9. The satellite radiowave receiving device according to claim 6,
    wherein the processor determines a receipt length of radiowaves for the second date and time information to be obtained before the positioning calculation according to a maximum error assumed in the second date and time counted by the clock circuit.

10. The satellite radiowave receiving device according to claim 1,
    wherein the processor determines whether date and time information is to be obtained before the positioning calculation according to a maximum error assumed in the second date and time counted by the clock circuit.

11. The satellite radiowave receiving device according to claim 10,
    wherein the processor determines a receipt length of radiowaves for the second date and time information to be obtained before the positioning calculation according to the maximum error assumed in the second date and time counted by the clock circuit.

12. The satellite radiowave receiving device according to claim 1,
    wherein the processor determines a receipt length of radiowaves for the second date and time information to be obtained before the positioning calculation according to a maximum error assumed in the second date and time counted by the clock circuit.

13. An electronic timepiece comprising the satellite radiowave receiving device according to claim 1.

14. The satellite radiowave receiving device according to claim 1,
wherein the processor modifies the second date and time in a case where
the processor obtains the new date and time information, and
an elapsed time since last modification of the second date and time is equal to or longer than a predetermined time.

15. The satellite radiowave receiving device according to claim 1,
wherein the processor is configured to:
determine whether the second date and time information is modified or not,
in response to determining that the second time and date information is not modified, modify the second the date and time based on the first date and time information.

16. A positioning control method comprising:
obtaining first date and time information included in radiowaves received via a receiver from a single positioning satellite which is acquired first after a start of receipt of radiowaves;
in response to receiving radiowaves via the receiver from multiple satellites which include the single positioning satellite and which are required for a positioning calculation, modifying second date and time information which is counted by a clock circuit using the first date and time information; and
performing the positioning calculation using the date and time information of the multiple positioning satellites and a predicted orbit data retrieved from a memory,
wherein the predicted orbit data is collected and retained in the memory before the obtaining of the radiowaves for retrieval.

17. A non-transitory computer-readable recording medium containing a program to be executed by a processor of a satellite radiowave receiving device, wherein the program causes the processor to:
obtain first date and time information included in radiowaves received via a receiver from a single positioning satellite which is acquired first after a start of receipt of radiowaves;
in response to receiving radiowaves via the receiver from multiple satellites which include the single positioning satellite and which are required for a positioning calculation, modify second date and time information which is counted by a clock circuit using the first date and time information; and
perform the positioning calculation using the date and time information of the multiple positioning satellites and a predicted orbit data retrieved from a memory of the device,
wherein the predicted orbit data is collected and retained in the memory before the obtaining of the radiowaves for retrieval.

* * * * *